United States Patent
Ellis et al.

(10) Patent No.: US 10,554,989 B2
(45) Date of Patent: Feb. 4, 2020

(54) EFFICIENT ENCODING OF DISPLAY DATA

(71) Applicants: Dan Ellis, Cambridge (GB); Eric Hamaker, Cambridge (GB)

(72) Inventors: Dan Ellis, Cambridge (GB); Eric Hamaker, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 191 days.

(21) Appl. No.: 14/901,636

(22) PCT Filed: Jun. 20, 2014

(86) PCT No.: PCT/GB2014/051907
§ 371 (c)(1),
(2) Date: Dec. 28, 2015

(87) PCT Pub. No.: WO2014/207439
PCT Pub. Date: Dec. 31, 2014

(65) Prior Publication Data
US 2016/0373772 A1    Dec. 22, 2016

(30) Foreign Application Priority Data
Jun. 28, 2013 (GB) .................................. 1311672.8

(51) Int. Cl.
*H04N 11/02* (2006.01)
*H04N 19/42* (2014.01)
(Continued)

(52) U.S. Cl.
CPC .......... *H04N 19/42* (2014.11); *H04N 19/137* (2014.11); *H04N 19/176* (2014.11); *H04N 19/182* (2014.11)

(58) Field of Classification Search
CPC .................................................... H04N 19/42
(Continued)

(56) References Cited

U.S. PATENT DOCUMENTS 5,680,478 A * 10/1997 Wang ................ G06K 9/00456
382/171
2003/0169264 A1    9/2003 Emerson
(Continued)

FOREIGN PATENT DOCUMENTS

| GB | 2207829 A | 2/1989 |
|----|-----------|--------|
| WO | 2009047694 A1 | 4/2009 |
| WO | 2011109555 A1 | 9/2011 |

OTHER PUBLICATIONS

Richardson et al.: "Virtual Network Computing" IEEE Internet Computing, vol. 2, No. 1, Jan. 1, 1998 (Jan. 1, 1998), pp. 33-38, XP002142727, ISSN: 1089-7801, DOI: 10.1109/4236.656066.
(Continued)

*Primary Examiner* — Leron Beck
(74) *Attorney, Agent, or Firm* — AEON Law, PLLC; Adam L. K. Philipp; Martin S. Garthwaite (57) ABSTRACT

A method of encoding display output of a computer using a block-based video encoder, such as H.264 includes receiving display update information, the display update information specifying at least one changed display area. Pixel data associated with the at least one changed area is also received. For each image block of an output frame to be encoded, the encoder determines whether the image block intersects one or more of the changed areas. A block skip indication is encoded for each image block not intersecting at least one changed area, and pixel data is encoded for intersecting blocks. An encoded output frame is then generated including the block skip indications and encoded pixel data.

20 Claims, 5 Drawing Sheets

(51) Int. Cl.
*H04N 19/176* (2014.01)
*H04N 19/137* (2014.01)
*H04N 19/182* (2014.01)

(58) Field of Classification Search
USPC ........................................ 375/240.01–240.29
See application file for complete search history.

(56) References Cited

U.S. PATENT DOCUMENTS

| | | |
|---|---|---|
| 2006/0282855 A1 | 12/2006 | Margulis |
| 2011/0142132 A1* | 6/2011 | Tourapis ............. H04N 19/597 375/240.16 |
| 2011/0199389 A1* | 8/2011 | Lu .......................... G06F 3/017 345/619 |
| 2012/0328008 A1 | 12/2012 | Uchida |

OTHER PUBLICATIONS

Wiegand T. et al., "Overview of the H.264/AVC Video Coding Standard", 2003, IEEE Transactions on Circuits and Systems for Video Technology, vol. 13, No. 7, pp. 560-576, available at http://ip.hhi.de/imagecom_G1/assets/pdfs/csvt_overview_0305.pdf.

\* cited by examiner

EFFICIENT ENCODING OF DISPLAY DATA

The present invention relates to methods and systems for efficiently encoding display data, for example for transmission over a general-purpose data transport such as USB or Wi-Fi.

Conventional computer displays utilise a variety of specialised connections such as VGA, DVI or HDMI connections, coupled to dedicated video hardware in order to output a display signal to a display. This need for dedicated connection hardware can increase the cost and complexity of computers.

Systems have been developed that allow connection of displays over certain other specialised types of connections. For example, the Thunderbolt interface combines transport of DisplayPort and PCI Express communications over a single connection, to enable a variety of peripheral devices to use a single port. However, specialised new hardware must be added to the computer to implement this interface.

Systems for connecting a display to a computer over USB are also available. Such systems generally use a software display driver loaded by the computer's operating system, which transmits display data over USB instead of via the standard display connection. The data is received at a display adapter connected via a conventional display interface to the display itself. Some form of compression of the display data is typically used to allow a reasonable quality image to be transmitted over the limited available bandwidth provided by USB. This, however, entails significant encoding overhead at the computer, especially where conventional video codecs are used. Alternatively, special-purpose video encoding software may be provided (together with a corresponding decoder in the display adapter) but this adds to the overall cost and complexity of the system.

The present invention seeks to alleviate some of these problems.

Accordingly, in a first aspect of the invention, there is provided a method of encoding display output of a computer using a block-based video encoder, the method comprising: receiving display update information, the display update information specifying at least one changed display area; receiving pixel data associated with the at least one changed display area; for a plurality of image blocks of an output frame to be encoded, determining whether each image block intersects one or more of the changed display areas; encoding a block skip indication for each image block not intersecting at least one changed display area; encoding received pixel data for each intersecting block; and generating an encoded output frame including the block skip indications and encoded pixel data.

This approach can reduce the computational effort involved in encoding an output frame by avoiding the need to encode pixel data for each block (for example, this may eliminate the need for loading and comparing pixel data for such blocks).

The term "block-based video encoder" preferably refers to any encoder using an encoding algorithm or scheme that subdivides a frame into multiple regions, segments, slices or tiles that are encoded individually. A block can thus be any subregion of a frame. Some encoding schemes use multiple layers of subdivision (e.g. dividing a frame into macroblocks which are themselves further divided into smaller blocks). The term "block" can refer to blocks or macroblocks in such a scheme, though in a preferred embodiment the blocks correspond to macroblocks, with the described coding decisions being made at the macroblock level.

The determining and encoding steps are preferably performed for each block (or macroblock) of the output frame. Where a block skip indication is encoded for a block, no pixel data is preferably encoded for that block in the frame.

The display update information preferably comprises information specifying one or more rectangular areas of a display image that are being (or have been or are to be) modified. The pixel data preferably comprises pixel data for the or each rectangular area, preferably specifying a complete set of pixels for the or each rectangular area. In preferred embodiments the display update information comprises a list of dirty rectangles (or a reference to such a list).

Receiving one or both of the display update information and the pixel data preferably comprises interfacing with a graphics subsystem component of an operating system, preferably a graphics Application Programming Interface (API). Interfacing may comprise intercepting or trapping a call to the API, preferably via an API shim. The call may originate from another operating system component (e.g. a graphics subsystem component) or from an application program. Received pixel data and/or display update information may be referenced or contained in, or derived from, the API call or multiple such calls. Receiving pixel data may comprise reading the pixel data from a pixel buffer such as a frame buffer.

In a particular example, receiving display update information may comprise trapping a call to an operating system display update operation, the display update information preferably referenced or included in one or more parameter(s) of the call.

Encoding received pixel data for an intersecting block preferably comprises encoding received pixel data associated with a changed area intersecting the block, optionally together with further pixel data from a corresponding block in an earlier output frame. The corresponding block is preferably a block at the same block position within the earlier frame. The encoded received pixel data preferably corresponds to a region of the block where the changed area intersects the block and the further pixel data corresponds to a region of the block where the changed area does not intersect the block. The earlier output frame may be an immediately preceding output frame processed or generated by the encoder.

The further pixel data may be obtained from cached pixel data corresponding to the earlier frame. The method may comprise storing a copy of pixel data corresponding to the (current) output frame, and preferably using the stored pixel data in encoding a subsequent or later frame.

The encoded frame is preferably compliant with a block-based video coding standard, and is thus preferably decodable by a corresponding standards-compliant decoder without modification to the decoder.

Preferably, the method comprises outputting the encoded output frame for transmission to a display over a general-purpose data transmission medium, wherein the data transmission medium preferably comprises one of: a Universal Serial Bus (USB); and a wireless local area network (WLAN) connection.

Advantageously, the method may comprise transmitting the encoded output frame to a display adapter connected to the computer via the general-purpose data transmission medium, decoding the encoded output frame at the display adapter, and outputting a display image based on the decoded output frame to a display connected to the display adapter. The decoding is preferably performed by a standards-compliant video decoder corresponding to the block-based video coding standard used in encoding the output frame. The decoding preferably comprises, for a block for which the output frame includes a block skip indication, generating pixel data based on pixel data of a corresponding block of an earlier decoded frame. The corresponding block is preferably a block at the same block position within the frame. The earlier frame may be the immediately preceding frame decoded by the decoder; pixel data for the earlier frame may be cached at the display adapter.

The method may comprise transmitting a video stream including the encoded output frame. Preferably the video stream includes a sequence of frames encoded in the manner set out above, preferably at a predetermined frame rate.

The blocks are preferably macroblocks, and encoding a block skip indication preferably comprises encoding a skip macroblock. Alternatively, encoding the block skip indication may include adding other metadata to the frame indicating that the block was skipped by the encoder and is to be reconstituted at the decoder.

The encoded output frame, video stream and/or video decoder are preferably encoded or operate in accordance with a block-based video coding standard that preferably supports specifying a block or macroblock as a skip block or skip macroblock, to indicate that the block/macroblock was skipped by the encoder (i.e. no pixel data is included in the frame for the block/macroblock) and should be reconstituted at the decoder from another source, e.g. a corresponding block/macroblock of an earlier frame. The video coding standard is preferably an MPEG video coding standard, preferably an MPEG-4 video coding standard, more preferably an MPEG-4 Part 10/Advanced Video Coding or H.264 video coding standard.

In a further aspect of the invention, which may optionally incorporate any of the elements or preferred features of the above aspect, there is provided a method of encoding display output of a computer using a block-based video encoder, comprising generating a sequence of encoded frames representing the display output at respective time instances, the generating comprising, for each time instance: determining whether display update information has been received; if no display update information has been received, generating an output frame comprising a block skip indication for each block of a set of blocks of the output frame; if display update information has been received, encoding an output frame based on the display update information; and outputting the output frame as part of the sequence of encoded frames.

This approach enables efficient encoding of a video signal corresponding to a computer's display output. The time instances are preferably regularly spaced in time, or in other words, the sequence of encoded frames preferably forms a video signal with a predetermined frame rate.

The display update information preferably specifies at least one changed display area; and encoding an output frame based on the display update information comprises encoding a skip indication for each block of a set of blocks of the output frame that does not intersect at least one of the specified changed display areas. Encoding the output frame preferably comprises encoding pixel data for each block that intersects at least one of the specified changed display areas.

More generally, the step of encoding an output frame based on the display update information may comprise performing any method as set out above in relation to the first aspect of the invention.

In further aspects, the invention provides a display output encoder having means (for example in the form of a processor with associated memory) for performing any method as set out herein, and a computer program or computer program product comprising software code adapted, when executed on a data processing apparatus, to perform any method as set out herein.

In a further aspect of the invention, there is provided a system for encoding display output of a computer using a block-based video encoder, the system comprising: a first component adapted to intercept calls to a graphics API of an operating system of the computer, and to store display update information obtained based on the API calls in a cache, the display update information comprising changed area information; and a second component adapted to access the cache and encode a sequence of video frames of a video signal at a predetermined frame rate based on display update information stored in the cache, wherein the encoding comprises selectively encoding pixel data and block skip indications for image blocks in dependence on the changed area information. The first and second components are preferably software components. The first and second components are preferably adapted to operate asynchronously with respect to each other. The first component may comprise a graphics API shim. The second component is preferably adapted to perform encoding using a method as set out with regard to any of the above aspects of the invention.

More generally, the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which.

Overview

In a conventional PC, dedicated display adapter hardware provides an interface to a display. The display adapter may be integrated into a motherboard or provided as an expansion card (e.g. PCI-Express). Display adapters commonly provide a basic VGA-compatible feature set, together with more advanced functionality, such as hardware-accelerated 3D rendering and media encoding/decoding. The connection from the display adapter to the display is via specialised output connectors and cables, such as those based on the VGA (HD15), DVI, HDMI, or DisplayPort standards.

Firmware and software components that run prior to operating system boot, (e.g. BIOS/UEFI boot code and OS loader software) may generate screen output by writing directly to a frame buffer of the display adapter, which may be memory-mapped into the processor's address space. Additionally, software interfaces may be available in the form of BIOS routines or UEFI GOP drivers to simplify output to the screen during the boot stage.

Once the operating system has been started, the operating system typically runs a display driver, which may be generic (based on display standards such as VGA) or may be hardware specific (e.g. NVIDIA GeForce or AMD Catalyst driver software). The display driver provides access to the display hardware, including advanced functionality such as 3D rendering where available.

Embodiments of the invention provide a system enabling display output to be transmitted from a computer to a display device without the need for special-purpose display adapter hardware and connections. Instead, the display signal can be carried over a general-purpose data connection. This may be a data bus used for attaching peripherals to a PC, such as USB or IEEE1394, a short-range wireless interface such as a Bluetooth, Infrared or Near-Field Communication (NFC) connection, or a connection used for remote communication, such as an Ethernet LAN or Wireless LAN.

In the embodiments described below, the data transport connection is a Universal Serial Bus (USB), but it will be understood that, in principle, the invention may be adapted to any data transport mechanism or medium.

Furthermore, the invention more generally provides efficient encoding from an asynchronous programmatic graphics subsystem to a synchronous compressed video stream, and can be applied in any context where such a compressed video stream is to be generated, whether for transmission or storage.

Figure 1:
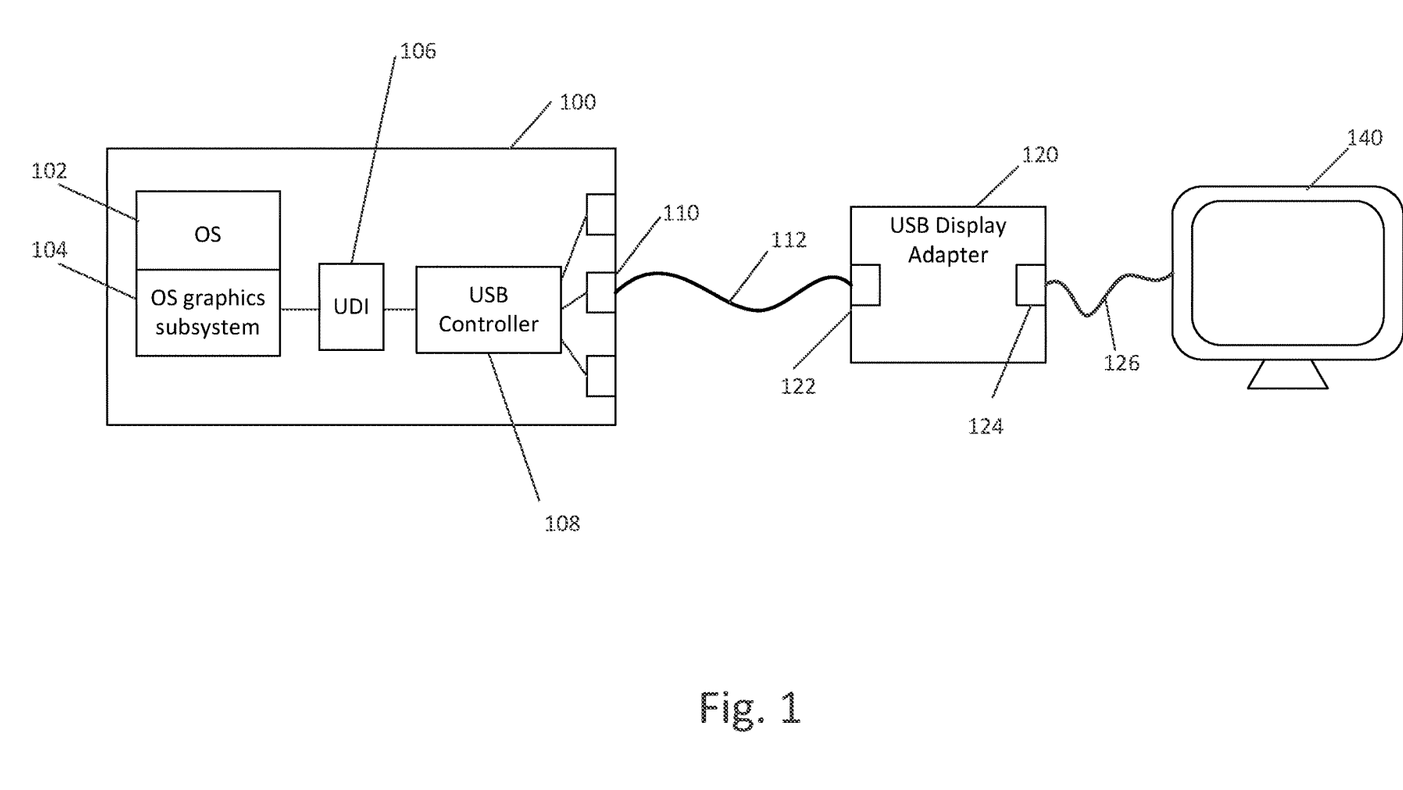
FIG. 1 illustrates in overview a display system for providing display output over a USB connection.

An embodiment is illustrated in overview in FIG. 1, and includes a computing device 100, such as a desktop or laptop PC, which is connected to a display 140 via a USB display adapter 120.

The computer 100 comprises a conventional USB controller 108 and associated USB ports. One of the USB ports 110 connects to a USB port 122 in the USB display adapter 120, e.g. via a standard USB cable 112. The USB display adapter connects to the display 140 via a conventional display port 124 and display cable 126 (e.g. VGA, DVI or HDMI). Instead of connecting via cables, the USB display adapter 120 may be in the form of a dongle that connects directly to either the computer or to the display (with a cable providing the other connection leg). Wireless display interfaces may also be used.

Display output is generated by software running on computer 100. The environment in which that software is running is controlled by an operating system 102, which generates display output, for example in the form of the familiar windowed desktop environment, via a graphics subsystem 104. Graphics subsystem 104 may conventionally include a variety of components including, for example, a window manager, display compositor, and display driver.

A software interface layer 106 provides for the capture of display data and its transport over the USB interface to the USB display adapter. This interface layer is referred to herein as the USB Display Interface, UDI. The UDI 106 preferably operates transparently by intercepting display output from the OS graphics subsystem 104, so that no modification of the OS software is required to enable use of the UDI. In a preferred embodiment, the UDI 106 is in the form of a display driver which interfaces with the graphics subsystem in a similar manner to an ordinary graphics driver, but which implements functionality for compression of display data and transport of the compressed data over USB.

In particular, the UDI 106 performs the following functions:
- Integrates into the OS graphics subsystem
- Initialisation and control of the USB display
- Collecting pixel data, encoding that data and transmitting it over USB
- Scaling image data to match output to available resolutions of the attached display The UDI 106 accesses the USB hardware (i.e., USB Controller 108 and port 110) by way of the operating system's USB driver stack.

The USB display adapter 120 receives, decompresses and buffers the display data, performs any necessary format conversion and outputs a display signal to the display 140 over the conventional display connection comprising connector 124 and cable 126 (e.g. a VGA, DVI or HDMI link).

The USB display adapter 120 includes a processor, a video decoder and a video output controller. The processor handles actions such as mode queries, mode setting, blanking and the like, while the video decoder handles the compressed video stream received from the computer. The video decoder decompresses the video into a memory framebuffer that is rasterised out to the display by the video output controller.

In an alternative embodiment, a wireless local area network (WLAN) connection is used instead of USB for connecting the computer to the display adapter, for example based on a Wi-Fi WLAN standard (i.e. one of the IEEE 802.11 WLAN standards, such as 802.11 g or 802.11 n). A Wi-Fi Direct connection could also be used. In such embodiments, the computer 100 and display adapter 120 are provided with WLAN interfaces and transceivers, either for direct communication, or for indirect communication via a wireless router/access point (alternatively communication could combine wired and wireless communication via a router/switch).

The operation of the UDI will be described in more detail below. Though largely described in the context of versions of the Microsoft Windows operating system and associated display driver architectures (especially versions of Windows using the Windows Driver Foundation, e.g. Windows 2000 and later), it will be understood that the same basic principles can be adapted for use in other operating system environments and driver architectures. Furthermore, the UDI may take other forms during operational stages of the computer when the operating system is not running or the OS graphics subsystem has not yet been established, for example during boot. As an example, the UDI could be in the form of a Unified Extensible Firmware Interface (UEFI) Graphics Output Protocol (GOP) driver used during the early stages of computer startup.

Operation of the USB Display Interface

The USB Display Interface (UDI) 106 provides a software interface to allow operation of the system without dedicated video hardware and without dedicated video connectors. The UDI cannot rely on any hardware to perform the rasterisation of the in-memory framebuffer and so this functionality is implemented in software (running on the system CPU).

The operation of the UDI involves a capture, compress and transport pipeline for obtaining and processing display data and outputting it over the USB connection. Capture of display data is preferably implemented through a standard graphics API available within the operating system.

Figure 2:
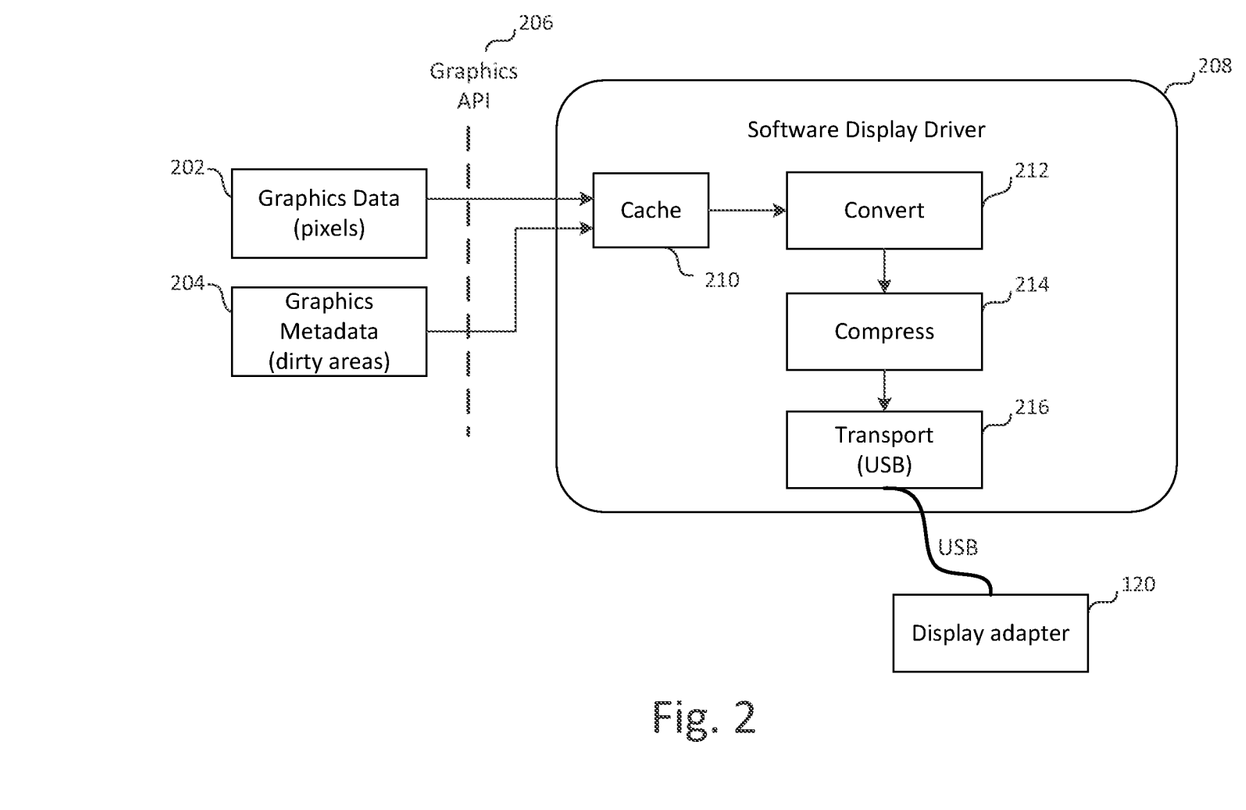
FIG. 2 illustrates operation of a USB display interface driver.

A UDI software driver implementing a standard graphics API is illustrated in FIG. 2. In this approach, a software display driver 208 takes the place of a conventional display driver and associated display hardware. Graphics data, e.g. in the form of pixel data 202 and associated metadata 204 is received by the driver 208 via the standard graphics API 206 and stored in a cache 210.

Metadata 204 includes change information providing information about what areas on the screen have been changed in the current screen update. Such change information is also known as "dirty area" information or "dirty rectangles", and typically defines one or more rectangular areas of the screen which have been modified. Other forms of metadata may include the resolution and format of the pixel data, the refresh rate and rotation of the screen, and the like.

The cache 210 supplies pixel data and metadata to a pipeline comprising a conversion component 212, a compression component 214 and a USB transport component 216.

The conversion component 212 converts the graphics data into a format suitable for transport over USB (this may, for example, include performing any necessary scaling). The compression component 214 compresses the data using a suitable video encoder in order to reduce the data volume to be transported.

The conversion and compression components operate to encode only those parts of the display that have changed since the last frame transmitted to the display (e.g. only the parts affected by the Graphics API call currently being handled). Those parts are identified based on the dirty area information forming part of the graphics metadata 204. The output of the compression component then only includes compressed data for the changed areas of the frame, as will be described in more detail below.

The compression component outputs compressed information in the form of a series of display frames to the USB transport component 216, which packetizes the compressed data into transfer units of a size and format appropriate to the bus and display adapter, and outputs the packetized data to the display adapter 120 over the USB link. This involves interfacing with a standard USB interface (e.g. a USB driver provided by the OS).

The compression component 214 is preferably in the form of a video encoder which performs encoding using a block-based coding algorithm such as H.264 (also known as MPEG-4 Part 10 or AVC, Advanced Video Coding). Other block-based video codecs may be used. The encoded data stream is received by the display adapter 120 where it is decoded by a corresponding video decoder and output to the display.

The UDI may be included in (or installed during) a standard OS installation. Alternatively an existing computer (with installed OS) may be configured to use the UDI by installing the relevant UDI software driver(s).

Figure 3:
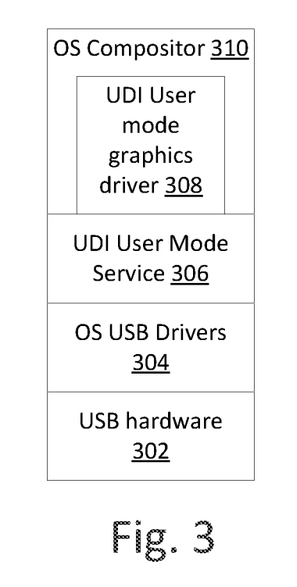
FIG. 3 illustrates a software/hardware stack for transmission of display data over USB.

The UDI may comprise multiple driver components, depending on the OS environment. FIG. 3 illustrates a software/hardware stack used to generate display output and transmit the display output over USB in a Windows OS environment. The stack includes the OS compositor 310 which composites the display screen (e.g. by combining output generated by multiple application windows and OS interface components) and outputs updates to a UDI User mode graphics driver 308. The UDI User mode graphics driver passes display data to a UDI User Mode Service 306, which includes the video encoder and USB transport functionality (i.e. the convert/compress/transport pipeline of FIG. 2). The UDI User Mode Service outputs data via the OS USB drivers 304 to the USB hardware 302 for onward transmission.

Other software architectures could be used, depending on requirements and OS environment. For example, the UDI could be implemented in part or wholly as a kernel mode display driver.

Encoding of the Display Output

The UDI receives display data in the form of occasional partial screen updates from the OS graphics subsystem. These updates are generated in response to actual changes (e.g. an application drawing to an application window) rather than on a periodic basis.

From these updates, the UDI generates an encoded video stream suitable for decoding and display by the remote display adapter.

Typical video codecs such as H.264 require a regular stream in time of frame updates (i.e. defining frame updates at a regular frame rate)—even if nothing has changed. Each frame will be compressed using either intra-frame compression, using data only from within the current frame (referred to as "I" frames), or inter-frame compression, using differences from previously encoded frames, e.g. "P" frames (predicted frames) or "B" frames (bidirectionally predicted frames). Inter-frame compression is typically based on motion prediction, in which a block of pixel data is encoded by way of one or more motion vectors together with an encoding of the associated prediction error (i.e. the difference between the actual block and the predicted block as produced by the motion vector).

Figure 4:
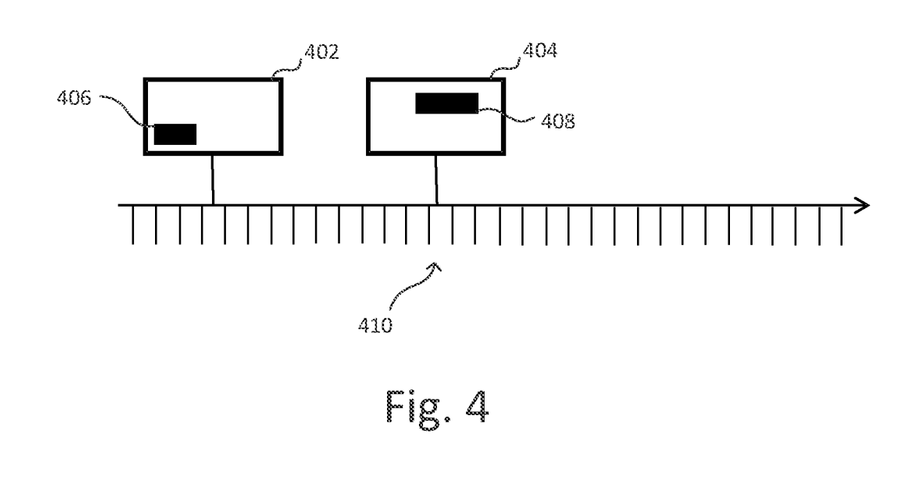
FIG. 4 illustrates the processing of display updates in relation to a regular frame rate used by a video encoder.

The difference between the irregular screen updates received from the OS graphics subsystem (usually in response to calls made to the OS graphics API), and the regular stream of frames of the encoded output is illustrated in FIG. 4, in which progression of time is represented by the central arrow, and the line marks below the arrow represent a regular sequence of time points 410 for which encoded output is to be generated (corresponding to the frame rate of the output signal).

The display output of a general-purpose computer (e.g. a windowed desktop environment provided by a general-purpose OS), when being used for typical computing tasks such as word processing, web browsing and the like, tends to change slowly compared to the frame rate of the compressed video stream. Also, any changes that occur are often limited to only a part of the screen output (e.g. an active window). In the example depicted in FIG. 4, the OS graphics subsystem generates a series of screen updates 402, 404 at a slower rate than the frame rate of the encoded video stream 410. Furthermore, each update only affects a region 406, 408 within the respective output image.

One approach to encoding such a graphical output for transmission using standard codecs would be to use a series of P-frames, each referencing the previous frame generated. In the FIG. 4 example, P-frames would be generated at each line mark below the arrow. Each P frame would be encoded in the usual way, to consist of a set of macroblocks predicted from the previous frame, for example by calculating the difference between each macroblock and the corresponding macroblock of the previous frame at the same location, and compressing the residuals in the normal way (that is, applying a frequency-domain transform e.g. DCT, and quantising and variable-length encoding the frequency-domain coefficients). Thus, a substantial amount of computational work is required even where there is little or no change in the image.

Some codecs, including H.264, provide a special macroblock type referred to as a "skip" macroblock. This allows a frame to include a skip indication instead of a fully coded macroblock. The decoder processes such a skip macroblock by generating content for the macroblock from other macroblocks or frames, e.g. by copying the macroblock from the previous frame or by interpolating motion vectors from other macroblocks. However, substantial analysis still has to be performed by the encoder at each output time point (frame), e.g. by comparing macroblocks, in order to determine when use of a skip macroblock is likely to be appropriate.

Embodiments of the invention provide a video encoder which uses knowledge from the OS graphics subsystem on changed areas of the display (instead of frame analysis and comparison) to generate skip macroblocks for the encoded video stream.

If the encoder knows from the OS graphics subsystem that the display output has not changed at all, then it can programmatically generate a frame full of skips without having to do any memory fetches or block comparisons at all. Similarly if the OS graphics subsystem indicates that just a small portion of the screen has been updated, the encoder can programmatically send skip macroblocks for areas that have no intersection with the partial screen update reported from the OS graphic subsystem instead of having to fetch the data from memory and perform comparisons and calculations as would normally happen.

Figure 5:
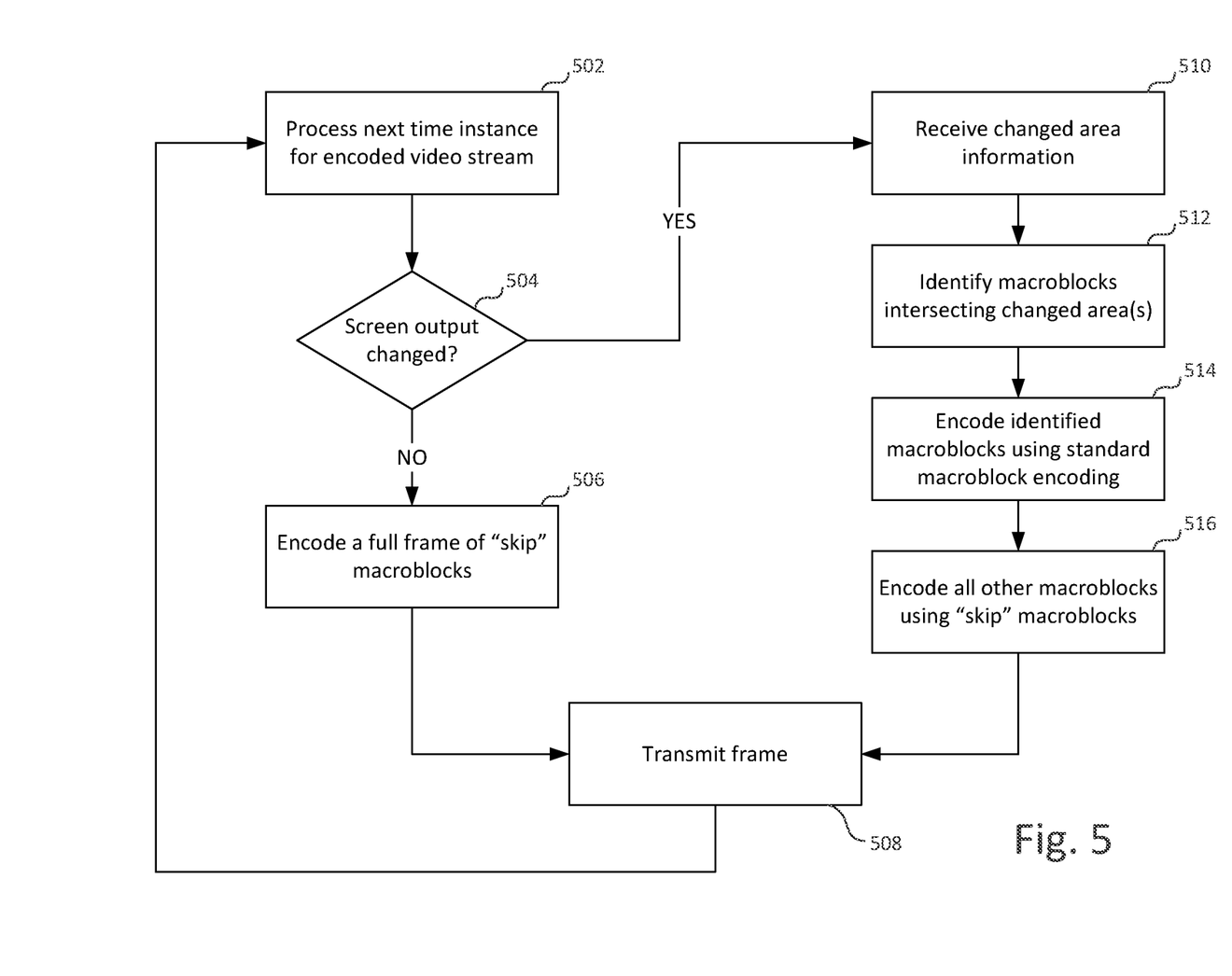
FIG. 5 illustrates an encoding process used by a video encoder.

The encoding process is illustrated in FIG. 5. The process starts in step 502 at the processing of the next time instance for the encoded video stream (i.e. the next frame to be output). In step 504, a determination is made whether the screen output has changed. If no change has occurred, then the encoder encodes a full frame of "skip" macroblocks (step 506). The generated frame is then transmitted in step 508.

If in step 504 it is determined that there has been a change in the screen output produced by the OS graphics subsystem, then the encoder receives the changed area information in step 510 (typically defining one or more rectangular areas). In step 512, the encoder determines which macroblocks of the output image intersect the changed area or areas. In step 514, the encoder encodes the identified intersecting macroblocks using standard macroblock encoding. In step 516, the remaining, non-intersecting macroblocks are encoded as "skip" macroblocks. The generated frame is then transmitted in step 508. After transmission of the frame, the process returns to step 502 to process the next time instance (frame).

Figure 6A:
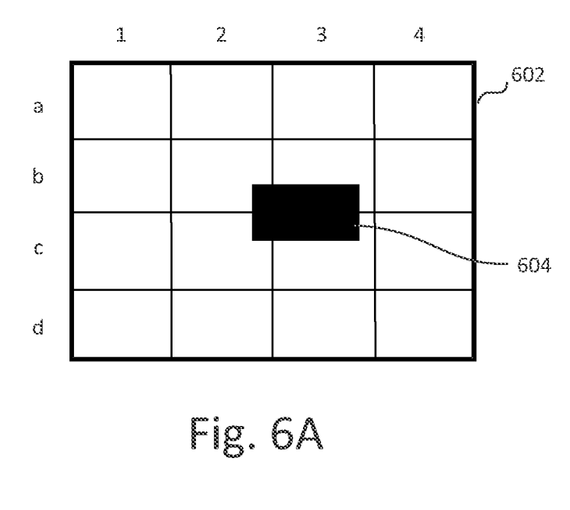
FIGS. 6A and 6B provide schematic representations of an output image and a corresponding encoded frame.
Figure 6B:
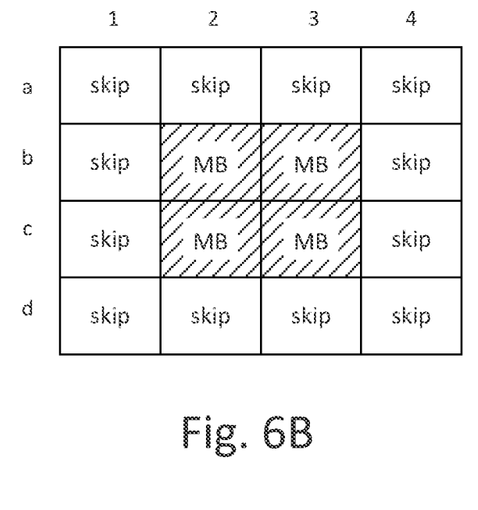

An example of how the encoding process is applied is illustrated in FIGS. 6A and 6B. FIG. 6A schematically illustrates an output image 602 generated by the OS graphics subsystem. The encoder divides the image 602 into a plurality of macroblocks a-1 to d-4 for the purpose of encoding. The particular number of macroblocks is chosen merely for illustrative purposes, and the image may be divided into any appropriate number of blocks or macroblocks, depending on the codec used and the output resolution.

The encoder receives changed area information from the graphics subsystem specifying that a rectangular area 604 has been modified during the last OS display update. The encoder then determines that the changed area 604 intersects macroblocks b-2, b-3, c-2 and c-3, and encodes those macroblocks in the normal way (e.g. using motion prediction and/or difference encoding to generate predicted macroblocks, or by generating intra-coded macroblocks).The remaining non-intersecting macroblocks a-1 to a-4, b-1, b-4, c-1, c-4 and d-1 to d-4 are not intersected by the changed area 604, and thus the encoder generates "skip" macroblocks for these without performing any analysis or comparison of the pixel data.

The resulting encoded frame is shown in FIG. 6B, with the skipped macroblocks marked "skip" and the normal encoded macroblocks marked "MB". The result is a fully encoded frame containing data for all macroblocks, which is thus compliant with the video codec used (in this example H.264).

Figure 6C:
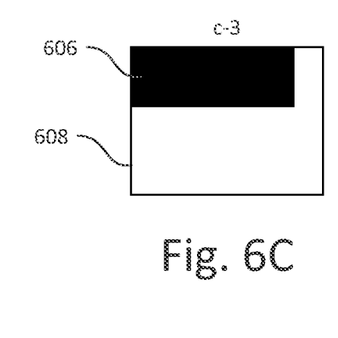
FIG. 6C illustrates encoding of a macroblock.

FIG. 6C shows a more detailed view of macroblock c-3. To encode the macroblock, the encoder combines the new pixel data 606 from the part of the changed area 604 that intersects macroblock c-3 with pixel data 608 from an earlier version of macroblock c-3, in a previously encoded frame. The new pixel data 606 is received as part of the graphics data 202, 204 obtained during the API call that caused the update (see FIG. 2). The encoder preferably maintains a copy of the previous frame (e.g. the immediately preceding frame) in memory and sources pixel data 608 from this cached frame. The combined pixel data then forms the macroblock that is encoded, e.g. using standard H.264 encoding algorithms as described above.

The video decoder in the USB display adapter 120 (FIG. 1) receives the frame, and decodes any normally encoded macroblocks (here b-2, b-3, c-2 and c-3) using the appropriate decoding techniques (e.g. decoding the DCT coefficients, performing an inverse DCT and performing motion prediction as appropriate). The video decoder then retrieves cached versions of the "skip" macroblocks from the previously displayed frame to produce the complete frame, which is then output to the display.

Obtaining Graphics Data Via the OS Graphics API

As described with reference to FIG. 2, the UDI driver 208 receives both pixel data 202 for one or more updated screen areas and metadata 204 specifying which region or regions have changed. These are referred to as "dirty areas" or "dirty rectangles".

In general terms, this metadata may be obtained from a relevant operating system component handling the screen update or from an application program causing the screen update.

In a preferred embodiment, as depicted in FIG. 2, the information is obtained through the operating system's graphics API, for example by trapping or implementing relevant API operations.

The OS graphics API is the means by which applications render to the screen. Typically this will be one application that composites the windows of other applications onto the desktop or it may be a graphics driver API through which applications cooperatively draw directly to the screen. It may be a 2D or a 3D API but in either case the application is using the API to execute drawing primitives into a display framebuffer. Operating at this API level, the UDI driver 208 is able to monitor the API primitives in use in order to track areas of change and also access the framebuffer in order to collect the pixel data of the change.

The UDI driver 208 may operate in a number of different ways to achieve this. In a first approach, the UDI driver may operate as a graphics driver implementing the graphics API (or relevant parts thereof). In this case the UDI driver 208 executes the API primitives itself and maintains the framebuffer itself. It can then track the changes and derive the dirty rectangle information as well as the associated pixel data which can be cached for access by the encode/transport pipeline.

In a second approach, the UDI driver 208 may implement a shim which observes the graphics API or a relevant part thereof (i.e. it intercepts or traps calls to the API). A shim may typically be implemented as a small library that transparently intercepts API calls and handles or redirects the operations. In this case the UDI driver monitors the API primitives but leaves the execution of the primitives to the underlying graphics driver (by routing the call to the graphics driver after any needed information has been extracted). In this approach, the dirty rectangle information (204) can either be derived from API calls or may in some cases be provided in the API call by the calling process. In this second approach, the UDI driver can obtain the required pixel data (202) by requesting the framebuffer contents from the underlying graphics driver.

In one such example, the UDI driver may trap a call to a relevant display update operation provided by the operating system graphics subsystem, where the call includes the dirty rectangle information.

In a particular embodiment, the operating system is a Microsoft Windows operating system, and the API call being trapped is the IDXGISwapChain1::Present1 method. This method includes as one of its parameters a pointer to a DXGI_PRESENT_PARAMETERS data structure for storing information describing updated rectangles and scroll information.

Specifically, this data structure includes a list of dirty rectangles (i.e. rectangular screen areas that have been updated by the calling process), along with information specifying a scrolling rectangle in the case that an area of the screen has been scrolled. The scrolling rectangle information (which is normally used by the operating system to optimise presentation of the updated display) is essentially a special type of dirty rectangle, and can thus be treated as another dirty rectangle by the UDI encoder.

The UDI traps the call to the Present1 method and extracts the dirty rectangle information from the call parameters. This information is then stored in the cache 210 for later (asynchronous) processing by the UDI driver's encoder/USB transport pipeline. If required, the UDI may then invoke the original OS Present1 method so that the OS can process the call and perform the display update (e.g. where a conventional display is in use in parallel with the USB display connected via the USB display interface of the present invention, for example in a mirrored dual-screen setup).

It will be understood that the present invention has been described above purely by way of example, and modification of detail can be made within the scope of the invention.

For example, although a system is described above in which a display output is transmitted over USB, the described approach is applicable to any software driven display device that might be connected by any generic bearer such as other wired or wireless peripheral connection standards, as well as wired or wireless local or wide area networks, or mobile data networks. In such systems, the USB-specific components described above (e.g. hardware USB controller and interconnects and USB driver stack) may be replaced with appropriate hardware and software (driver) components specific to the particular data transport used.

Furthermore, the encoding methods described may also be used to generate video data for storage instead of transmission. For example, the encoding methods could be employed by a screen capture application that records the computer's display output over time in a video file. Video data is preferably stored using a standards-compliant video file format that can be decoded by a standards-compliant decoder.

Though the embodiments described above describe the encoding as being performed on a macroblock basis, the described approaches may be applied to any block-based or tile-based video codec. In other words, any video codec that encodes picture data for a frame in portions, where a portion is a subset of a frame, can be used with the described approach, provided that the video codec supports inclusion of metadata enabling the encoder to indicate in some way that a particular portion or block of pixel data has been skipped in the encoding.

The invention claimed is:

1. A method of encoding display output of a computer using a block-based video encoder, the method comprising:
   receiving display update information, the display update information specifying at least one changed display area of a display image;
   receiving pixel data associated with the at least one changed display area;
   for a plurality of image blocks of an output frame to be encoded, determining, based on the received display update information, whether each image block intersects one or more of the changed display areas;
   encoding a block skip indication for each image block that is determined to not intersect at least one changed display area;
   encoding received pixel data for each image block that is determined to be an intersecting block; and
   generating an encoded output frame including the block skip indications and encoded pixel data; wherein receiving one or both of the display update information and the pixel data comprises interfacing with a graphics subsystem component of an operating system of the computer to obtain the one or both of the display update information and the pixel data.

2. The method according to claim 1, wherein the display update information comprises information specifying one or more rectangular areas of the display image that are being modified; wherein the pixel data comprises pixel data for each rectangular area.

3. The method according to claim 1, wherein the graphics subsystem component of the operating system comprises a graphics Application Programming Interface (API).

4. The method according to claim 1, wherein receiving display update information comprises trapping a call to an operating system display update operation, the display update information referenced or included in one or more parameter(s) of the call.

5. The method according to claim 1, wherein encoding received pixel data for an intersecting block comprises encoding received pixel data associated with a changed area intersecting the block, together with further pixel data from a corresponding block in an earlier output frame.

6. The method according to claim 5, wherein the encoded received pixel data corresponds to a region of the block where the changed area intersects the block and the further pixel data corresponds to a region of the block where the changed area does not intersect the block.

7. The method according to claim 1, comprising transmitting the encoded output frame to a display adapter connected to the computer via a general-purpose data transmission medium, decoding the encoded output frame at the display adapter, and outputting the display image based on the decoded output frame to a display connected to the display adapter.

8. The method according to claim 1, wherein the encoded output frame, video stream and/or video decoder are encoded or operate in accordance with a block-based video coding standard.

9. A method of encoding display output of a computer using a block-based video encoder, the method comprising generating a sequence of encoded frames representing the display output at respective time instances, the generating comprising, for each time instance:
 determining whether display update information specifying at least one changed display area of a display image has been received by interfacing with a graphics subsystem component of an operating system of the computer to check for display update information;
 if no display update information has been received, generating an output frame comprising a block skip indication for each block of a set of blocks of the output frame;
 if display update information has been received, encoding an output frame based on the display update information; and
 outputting the output frame as part of the sequence of encoded frames.

10. The method according to claim 9, wherein encoding an output frame based on the display update information comprises encoding a skip indication for each block of a set of blocks of the output frame that does not intersect at least one of the specified changed display areas.

11. The method according to claim 10, wherein encoding the output frame comprises encoding pixel data for each block that intersects at least one of the specified changed display areas.

12. The method according to claim 9, wherein the step of encoding an output frame based on the display update information comprises:
 receiving display update information, the display update information specifying at least one changed display area of a display image;
 receiving pixel data associated with the at least one changed display area;
 for a plurality of image blocks of an output frame to be encoded, determining whether each image block intersects one or more of the changed display areas;
 encoding a block skip indication for each image block not intersecting at least one changed display area;
 encoding received pixel data for each intersecting block; and
 generating an encoded output frame including the block skip indications and encoded pixel data; wherein receiving the pixel data comprises interfacing with a graphics subsystem component of an operating system of the computer to obtain the pixel data.

13. A display output encoder comprising:
 a processor configured to:
  receive display update information, the display update information specifying at least one changed display area of a display image;
  receive pixel data associated with the at least one changed display area;
  for a plurality of image blocks of an output frame to be encoded, determine, based on the received display update information, whether each image block intersects one or more of the changed display areas;
  encode a block skip indication for each image block that is determined to not intersect at least one changed display area;
  encode received pixel data for each image block that is determined to be an intersecting block; and
  generate an encoded output frame including the block skip indications and encoded pixel data; wherein
 the processor is further configured to receive one or both of the display update information and the pixel data by interfacing with a graphics subsystem component of an operating system of the computer to obtain the one or both of the display update information and the pixel data.

14. A non-transitory computer program comprising software code adapted, when executed on a data processing apparatus, to perform a method comprising:
 receiving display update information, the display update information specifying at least one changed display area of a display image;
 receiving pixel data associated with the at least one changed display area;
 for a plurality of image blocks of an output frame to be encoded, determining, based on the received display update information, whether each image block intersects one or more of the changed display areas;
 encoding a block skip indication for each image block that is determined to not intersect at least one changed display area;
 encoding received pixel data for each image block that is determined to be an intersecting block; and
 generating an encoded output frame including the block skip indications and encoded pixel data; wherein receiving one or both of the display update information and the pixel data comprises interfacing with a graphics subsystem component of an operating system of the computer to obtain the one or both of the display update information and the pixel data.

15. A system for encoding display output of a computer using a block-based video encoder, the system comprising:
 a first component adapted to intercept calls to a graphics API of an operating system of the computer, and to store display update information obtained based on the API calls in a cache, the display update information specifying at least one changed display area of a display image; and
 a second component adapted to access the cache and encode a sequence of video frames of a video signal at a predetermined frame rate based on display update information stored in the cache, wherein the encoding comprises:
 receiving the display update information;
 receiving pixel data associated with the at least one changed display area;
 for a plurality of image blocks of an output frame to be encoded, determining, based on the received display update information, whether each image block intersects one or more of the changed display areas;
 encoding a block skip indication for each image block that is determined to not intersect at least one changed display area;

encoding received pixel data for each image block that is determined to be an intersecting block; and generating an encoded output frame including the block skip indications and encoded pixel data; wherein receiving one or both of the display update information and the pixel data comprises interfacing with a graphics subsystem component of an operating system of the computer to obtain the one or both of the display update information and the pixel data.

16. The system according to claim 15, wherein the second component is adapted to perform encoding using a method comprising:

receiving pixel data associated with the at least one changed display area;

for a plurality of image blocks of an output frame to be encoded, determining whether each image block intersects one or more of the changed display areas;

encoding a block skip indication for each image block not intersecting at least one changed display area;

encoding received pixel data for each intersecting block; and     generating an encoded output frame including the block skip indications and encoded pixel data.

17. The system according to claim 16, wherein the display update information comprises information specifying one or more rectangular areas of the display image that are being modified; wherein the pixel data comprises pixel data for each rectangular area.

18. The system according to claim 16, wherein encoding received pixel data for an intersecting block comprises encoding received pixel data associated with a changed area intersecting the block, optionally together with further pixel data from a corresponding block in an earlier output frame.

19. The system according to claim 18, wherein the encoded received pixel data corresponds to a region of the block where the changed area intersects the block and the further pixel data corresponds to a region of the block where the changed area does not intersect the block.

20. The display output encoder according to claim 13, wherein encoding received pixel data for an intersecting block comprises encoding received pixel data associated with a changed area intersecting the block, optionally together with further pixel data from a corresponding block in an earlier output frame.

\* \* \* \* \*